F. STEWART.
HOSE-COUPLING.

No. 195,543. Patented Sept. 25, 1877.

WITNESSES:
E. Wolff
J. H. Scarborough

INVENTOR:
F. Stewart
BY Munn & Co
ATTORNEYS.

UNITED STATES PATENT OFFICE.

FREDERICK STEWART, OF ST. LOUIS, MISSOURI, ASSIGNOR TO HIMSELF AND OSCAR F. SCUDDER, OF SAME PLACE.

IMPROVEMENT IN HOSE-COUPLINGS.

Specification forming part of Letters Patent No. 195,543, dated September 25, 1877; application filed July 30, 1877.

*To all whom it may concern:*

Figure 1:
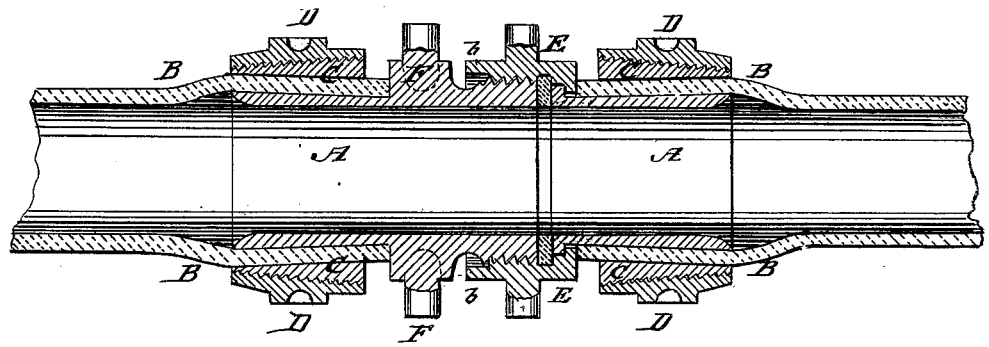
Figure 2:
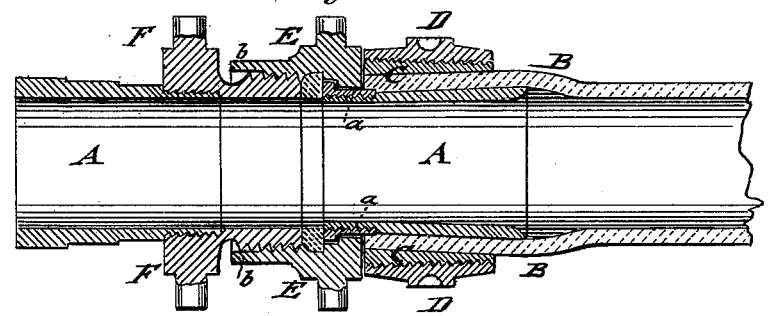
Figure 3:
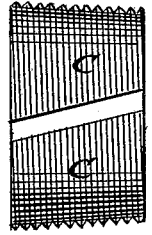

Be it known that I, FRED. STEWART, of St. Louis, in the county of St. Louis and State of Missouri, have invented a new and Improved Hose-Coupling, of which the following is a specification:

In the accompanying drawings, Figures 1 and 2 represent vertical sections of my improved hose-couplings, showing modified forms of the same; and Fig. 3 is a detail side view of the split screw-band employed for attaching the hose to the sleeves of the male and female sections of the coupling.

Similar letters of reference indicate corresponding parts.

This invention relates to an improved hose-coupling that is tightly connected with the the hose ends, so as to resist a considerable pressure on the coupling parts with less liability to blow out or disconnect the hose ends, as the connection of coupling and hose will be drawn tighter the greater the pressure exerted thereon.

The invention will first be described in connection with the drawing, and then pointed out in the claim.

Referring to the drawing, A represents the interior sleeve of the coupling, which is made with a slight taper. The hose end B is placed in position on the same, and rigidly secured thereon by a diagonally-split and tapering band, C, having a screw-thread cut on the outside, and by an outer sleeve, D, with corresponding taper, having an interior screw-thread.

The screwing up of the outer sleeve D on the split band closes the latter, and clamps the same and the hose tightly on the inner sleeve A. The diagonal cutting of the band C, as shown in Fig. 3, is for the purpose of allowing the screwing up of the outer sleeve and the closing of the band, thus accommodating itself to various thicknesses of hose.

The female coupling E is applied to turn loosely on the inner sleeve A, either by being placed on a collar of the same, as in Fig. 1, or by being connected by a short intermediate collar, $a$, that is screwed by an inner thread on the threaded end of the inner sleeve, so as to retain the female coupling on the circumferential shoulder of the same, as shown in Fig. 2. The male coupling is applied to the inner sleeve in the same manner.

The female coupling E has a recess, $b$, turned out at the end of the same, which recess acts as a guide to steady it in making the connection with the threaded part of the male coupling F, whose tapering sleeve end is either cast in one piece therewith or screwed in, as in Fig. 2. The outer sleeves are applied by a suitable wrench that enters recesses of said sleeves.

The clamping or wedge connection of the inner sleeve, split band, and outer sleeve with the intermediate hose end produces a tight fastening of the hose, that gets tighter the greater the pressure, so as to remove any liability to blow out by the pressure of the water on the coupling.

Having thus described my invention, I claim as new and desire to secure by Letters Patent—

In a hose-coupling, the combination with sleeves, to which the hose is clamped by wedges to a smooth surface, of the female coupling E, connecting by end collars with one sleeve, and screwing over a male coupling, F, that is an extension of the other sleeve, as shown and described.

FREDERICK STEWART.

Witnesses:
NELSON FILLMORE LYON,
HENRY BRUNING.